T. H. VAN BUREN.
CARBURETER.
APPLICATION FILED FEB. 5, 1909.
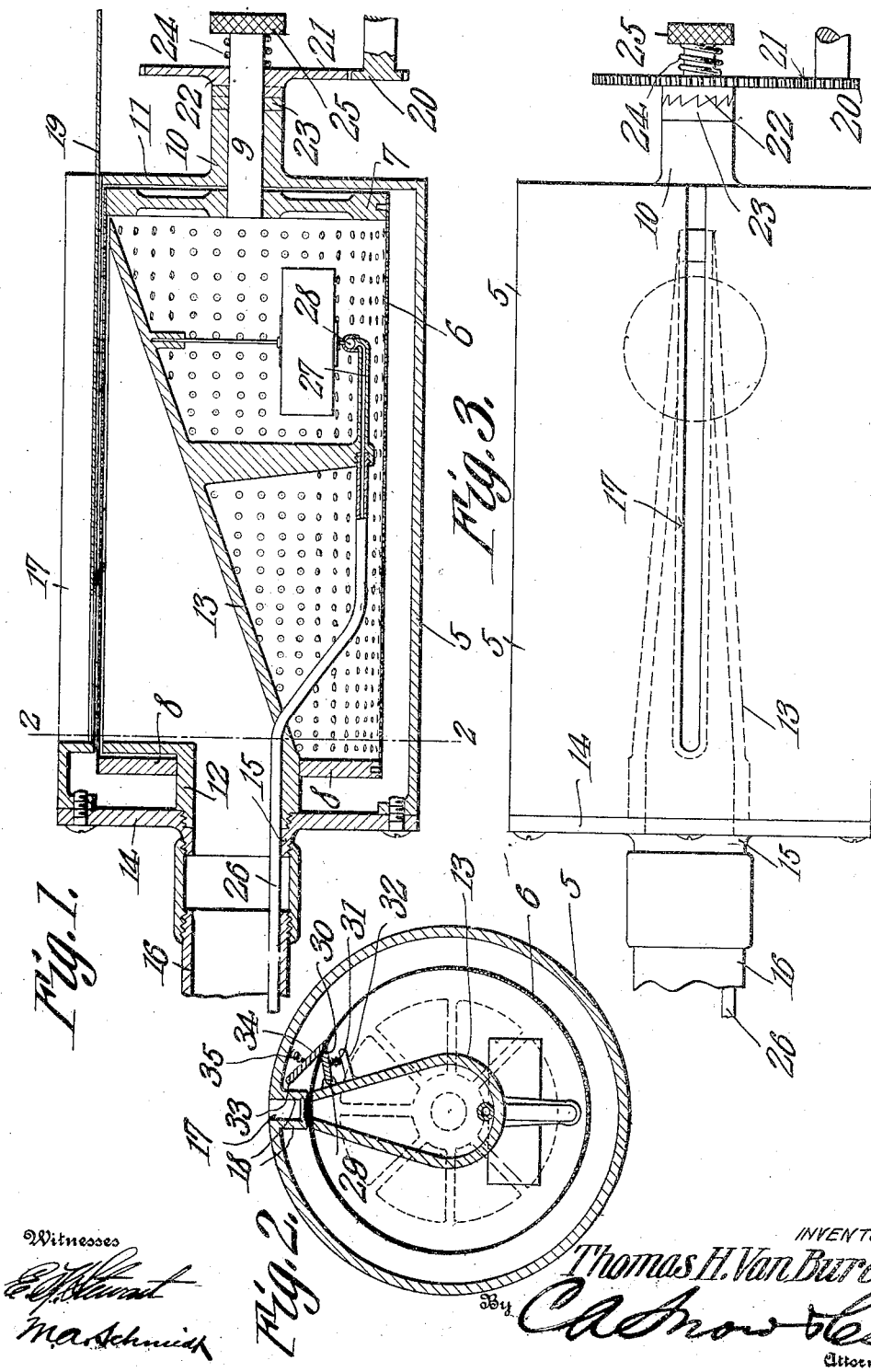

UNITED STATES PATENT OFFICE.

THOMAS H. VAN BUREN, OF GRAND JUNCTION, COLORADO, ASSIGNOR OF ONE-FOURTH TO CICERO G. SMITH, OF PALISADE, COLORADO.

CARBURETER.

951,923.  Specification of Letters Patent. Patented Mar. 15, 1910.

Application filed February 5, 1909. Serial No. 476,286.

*To all whom it may concern:*

Be it known that I, THOMAS H. VAN BUREN, a citizen of the United States, residing at Grand Junction, in the county of Mesa and State of Colorado, have invented a new and useful Carbureter, of which the following is a specification.

This invention relates to that type of carbureters for internal combustion engines characterized by a rotary screen which dips into the liquid hydrocarbon, and carries the same past an air intake where it is vaporized, and then sucked into the cylinder of the engine with which the apparatus is used. One of the objections of this type of carbureters is that when the engine is running fast, the screen travels so fast as to carry almost a wave of hydrocarbon around with it, and the object of the present invention is to overcome this defect, which is accomplished by the hereinafter described structure.

The invention also has for its object to provide means whereby the screen may be manually rotated when the engine is not running, in order that a fuel-laden portion may be brought into position before the intake, ready for the first suction stroke of the engine.

A further object of the present invention is to maintain a fixed ratio of fuel and air, as well as to provide means for controlling or throttling the charge in such a manner that the proportions of fuel and air remain the same at all positions of the throttle.

With the foregoing objects in view, the invention consists in a novel construction and arrangement of parts to be hereinafter described and claimed; reference being had to the drawing hereto annexed in which—

Figure 1 is a longitudinal sectional view of the carbureter. Fig. 2 is a vertical section on the line 2—2 of Fig. 1. Fig. 3 is a top plan view.

In the drawings, 5 denotes a cylindrical casing which contains the liquid hydrocarbon, and in which the screen 6 rotates, the latter being in the form of a cylinder, mounted concentric with respect to the casing. The screen cylinder is mounted at its ends on the rim of skeleton wheels 7 and 8, respectively. The wheel 7 is fixed on a shaft 9 mounted in a bearing 10 on the outside of the end wall 11 of the casing 5. The wheel 8 is mounted on the cylindrical end 12 of a vaporizing chamber 13 located inside the screen 6, said end 12 being mounted in an opening in the end wall 14 of the casing 5. On the outside of the last-mentioned end wall, the opening therein is formed with a nipple 15 for connection with a fuel supply pipe 16 leading to the cylinder of the engine.

The vaporizing chamber 13 is in the shape of a trough having a rounded bottom, and extending throughout the entire length of the screen. At the wheel 8, the bottom of the trough is below the center of the screen and it then extends upwardly through said cylinder at an angle or inclination so as to bring its opposite end close to the inner surface of the screen adjacent to the wheel 7, as clearly shown in Fig. 1 of the drawing. The side walls of the vaporizing chamber converge as shown in Fig. 2 and extend close to the inner surface of the screen, and merge with the bottom of the chamber adjacent to the wheel 7, as shown in Fig. 2. The chamber is also tapered in the direction of the wheel 7.

In the casing 5, directly opposite the mouth or open top of the vaporizing chamber 13, and extending the entire length thereof, is an air intake opening 17 from which a pair of walls 18 extend inwardly in the direction of the screen, said walls stopping close to the outer surface of the screen, directly opposite the mouth of the chamber 13, whereby an air intake is had having a length and width which is the same as the mouth of said chamber. The walls 18 are oppositely grooved to receive a slide 19 which is for a purpose to be presently described.

The screen 6 is rotatable from the engine shaft by gears 20 and 21, the latter being loosely mounted on the shaft 9, and provided with a ratchet clutch-face 22, adapted to engage a ratchet clutch-collar 23 fastened on the shaft 9, the teeth of the clutches being held in engagement with each other by a spring 24 coiled around the shaft 9 between a nut 25 thereon, and the gear 21.

Liquid hydrocarbon is supplied to the casing 5 by a pipe 26 extending thereinto through the opening in the wall 14 by the way of the contracted end 12 of the chamber 13. This pipe also passes through an opening in the bottom of the chamber 13, and communicates with a discharge nozzle 27 supported by said chamber. The nozzle is provided with a suitable float controlled valve 28 whereby a constant level is maintained in the casing 5.

On one of the side walls of the casing 13, on the outside thereof, is pivoted at 29 a blade or roller 30 which extends in the direction of the screen 6, and is held pressed against the inner surface thereof by a spring 31 mounted between the blade and a bracket 32 extending from said wall. To the end walls of the casing 5 is pivoted at 33 a blade or roller 34 which extends in the direction of and is pressed against the outer surface of the screen by a spring 35 mounted between the blade and the cylindrical wall of the casing.

The operation of the carbureter is as follows: Through the gears 20 and 21 the screen is rotated in the liquid fuel contained in the casing 5. Suction is produced in the chamber 13 at each suction stroke of the engine through the pipe connection 16 with the cylinder thereof, whereby air is drawn through the intake 17, and upon passing through that portion of the screen exposed to the intake, the liquid hydrocarbon carried thereon is vaporized and passes to the engine cylinder through the pipe 16. The blades 30 and 34 remove all of the liquid clinging to the screen, except that which is held in the perforations thereof, whereby the objection heretofore noted is entirely overcome. The screen is preferably made of punched sheet metal which affords a smooth surface to the blades. Upon disconnecting the gear 21 from the collar 23, the screen may be manually rotated, which permits a fuel-laden portion to be brought into position before the air intake ready for the first suction stroke of the engine. The gears 20 and 21 are so proportioned that during the interval between each suction stroke of the engine, the screen rotates and is advanced across just sufficiently to supply enough fuel for the intake of the particular engine upon which the carbureter is used, by reason of which a fixed ratio of fuel and air is maintained, and by means of the slide 19 the charge admitted to the engine cylinder is controlled or throttled in such a manner that the proportions of fuel and air remain the same at all positions of the slide. The arrangement of the air intake and the mixing chamber prevents the air which goes to the engine cylinder from taking up fuel at any other point than the one that is intended for this purpose. The end wall 14 is removably connected to the cylinder 5 in order that access to the interior may be had for the purpose of assembling the parts contained therein.

What is claimed is:—

1. In a carbureter for internal combustion engines, a liquid fuel casing having an air intake, a rotatable screen in the casing, geared to the engine, a clutch for disconnecting the screen from the engine to permit manual operation of the screen, and a vaporizing chamber behind the screen, said chamber opening opposite the intake, and communicating with the engine cylinder.

2. In a carbureter for internal combustion engines, a liquid fuel casing having an air intake opening, a vaporizing chamber mounted in the casing, and having an inlet located opposite and in close proximity to the air intake opening, and a cylindrical screen rotatably mounted in the casing, and traveling across the space between the air intake opening and the inlet of the vaporizing chamber, said vaporizing chamber being located inside the screen, and communicating with the engine cylinder.

3. In a carbureter for internal combustion engines, a liquid fuel casing having an air intake opening, a vaporizing chamber mounted in the casing, and having an inlet located opposite and in close proximity to the air intake opening, a cylindrical screen rotatably mounted in the casing, and traveling across the space between the air intake opening and the inlet of the vaporizing chamber, said vaporizing chamber being located inside the screen, and communicating with the engine cylinder, and means for varying the area of the air intake opening.

4. In a carbureter for internal combustion engines, a liquid fuel casing having an air intake, a cylindrical screen rotatably mounted in the casing and traveling past the air intake in close proximity thereto, and a vaporizing chamber inside the screen extending the entire length thereof and communicating with the engine cylinder, the side walls of the chamber extending in the direction of and stopping opposite the intake in close proximity to the inner surface of the screen.

5. In a carbureter for internal combustion engines, a liquid fuel casing having an air intake opening, and a wall surrounding said opening and extending into the casing, a slide mounted in said wall for controlling the area of the opening, a trough mounted in the casing, and in communication with the engine cylinder, the mouth of the trough being located opposite and in close proximity to the inner edge of the aforesaid wall, and a screen rotatably mounted in the casing, and traveling across the space between said inner edge of the wall and the mouth of the trough.

6. In a carbureter for internal combustion engines, a liquid fuel casing having an air intake opening, a trough mounted in the casing, and communicating with the engine cylinder, the mouth of the trough being located opposite and in close proximity to the air intake opening, a screen rotatably mounted in the casing, and traveling across the space between the mouth of the trough and the air intake opening, and means for advancing the screen between the suction strokes of the engine.

7. In a carbureter for internal combustion engines, a liquid fuel casing having a bearing at one end, and said casing having an air intake opening, a shaft mounted in the bearing, a trough mounted in the casing, and having at one end a cylindrical portion mounted in the wall of the casing opposite the first-mentioned end, and communicating with the engine cylinder, the mouth of the trough being located opposite and in close proximity to the aforesaid air intake opening, a cylindrical screen supported at one end by the aforesaid shaft, and at the other end on the cylindrical portion of the trough, the bottom of the trough at the cylindrical portion extending below the center of the screen, and then upwardly therefrom, its opposite end extending close to the inner surface of the screen, and said screen inclosing the trough and traveling across the space between the mouth thereof and the air intake opening, and a gearing between the aforesaid shaft and the engine.

In testimony that I claim the foregoing as my own, I have hereto affixed my signature in the presence of two witnesses.

THOMAS H. VAN BUREN.

Witnesses:
 W. G. BOYER,
 W. A. VAN BUREN.